United States Patent Office 3,298,984
Patented Jan. 17, 1967

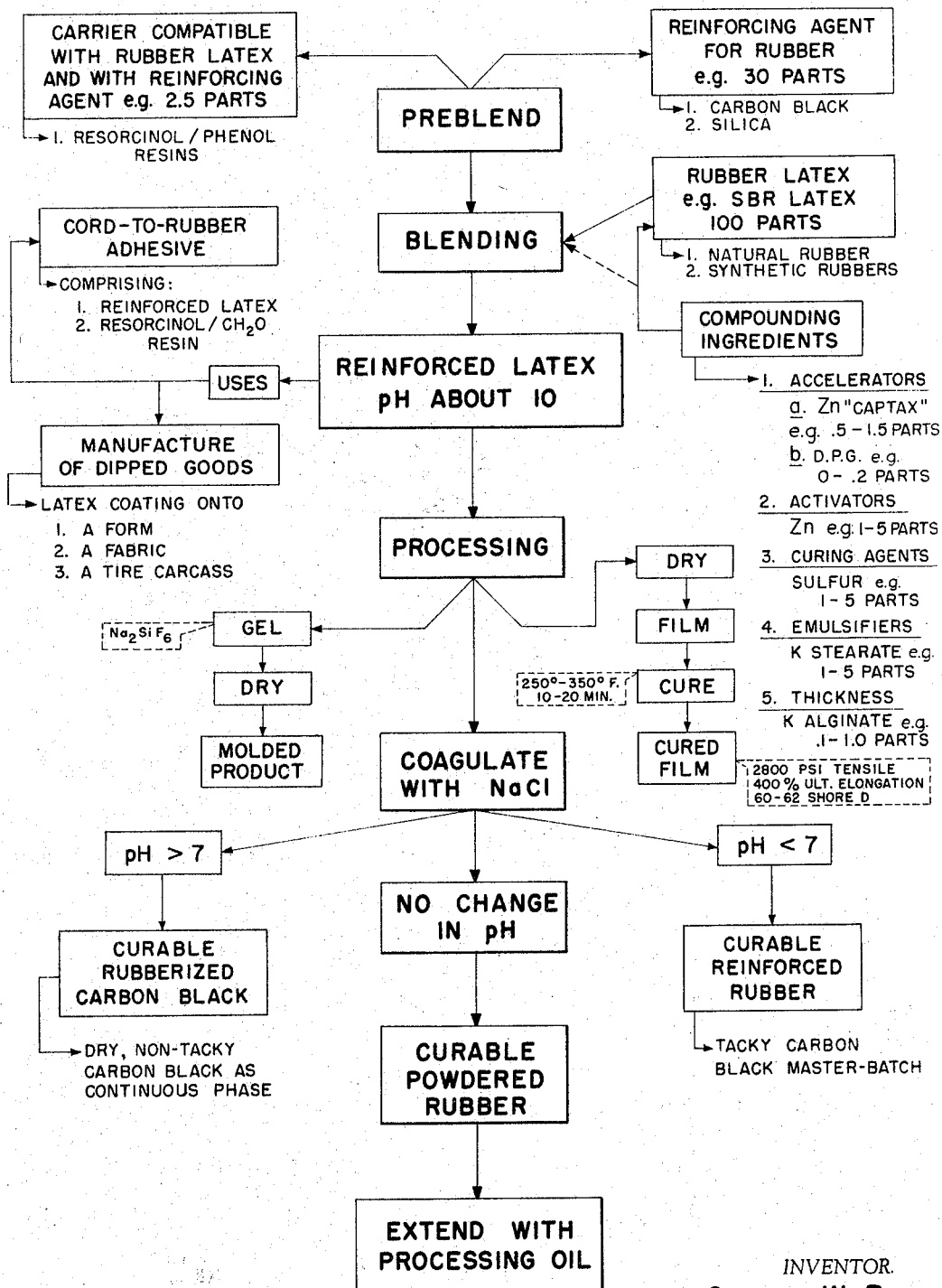

3,298,984
METHOD OF REINFORCING A RUBBER LATEX WITH CARBON BLACK BY PREBLENDING SAID CARBON BLACK WITH A PHENOL-ALDEHYDE RESIN
Grover W. Rye, Cuyahoga Falls, Ohio, assignor to The Goodyear Tire & Rubber Company, Akron, Ohio, a corporation of Ohio
Filed June 6, 1963, Ser. No. 285,920
4 Claims. (Cl. 260—29.3)

This invention relates to reinforced high molecular weight rubber, particularly reinforced rubber latex, to a method of compounding a rubber latex with a reinforcing agent and to uses for the reinforced latex and rubber resulting therefrom.

The true reinforcement of rubber in the latex form has been a problem of the latex chemist ever since rubber latex has been known and used commercially. Many investigators have reported various means for solving this problem, but in most instances true reinforcement is not obtained, particularly when working with such reinforcing agents as carbon black.

The drawing is a flow chart in simplified form showing by way of boxed information various modifications of the present invention.

The present invention is concerned with a method of reinforcing a rubber in its latex form which comprises preblending a reinforcing agent with a carrier which is compatible with both the rubber latex and with the reinforcing agent and then blending the preblend of carrier and reinforcing agent with the rubber latex in order to intimately associate both the carrier and the reinforcing agent with the particles of the rubber in the latex to thereby produce a reinforced rubber latex. The rubber latex may also be compounded with other ingredients including accelerators, activators, curing agents, emulsifiers, and, if need be, thickeners. The compounding ingredients may be added directly to the rubber latex, preferably before, but also may be added during or after the reinforcing agent is incorporated into the rubber latex with the aid of the carrier. The reinforced rubber resulting from the drying of a film of the reinforced rubber latex or from the coagulation of the reinforced rubber latex possesses an improved tensile strength far superior to the same rubber made from the same latex containing the same reinforcing agent but added in a manner other than the manner disclosed by the present invention.

More particularly, the present invention concerns the reinforcement of a synthetic rubber in latex form, for example, a 75 butadiene/25 styrene rubber latex with a reinforcing filler, such as any of the well-known reinforcing carbon blacks, particularly by first adding the reinforcing filler to the carrier and then adding this blend of components to the rubber latex.

The carrier may be any composition that is compatible both with the reinforcing agent and with the rubber component of the latex. This function of compatibility of the carrier with both the rubber of the latex and the reinforcing agent permits a true association in a reinforcing manner of the reinforcing agent with the rubber latex. Carbon blacks are well-known reinforcing agents, but have a tendency to be repelled by the rubber particles when in a latex and therefore true reinforcement of the rubber particles is not achieved.

It has been discovered that water-soluble phenolic resins, particularly the condensates resulting from the reaction of an aldehyde with a phenol are desirable carriers in bringing about the intimate association of the reinforcing agent with the rubber particles of the latex. Particularly valuable as a carrier in the present invention are the condensates resulting from the reaction of formaldehyde and a polyhydric phenol such as resorcinol and of special value are those condensates when made with a deficient amount of the aldehyde.

It is theorized that the carrier is adsorbed on the surface of the reinforcing agent used, for example, carbon black, thus becoming intimately associated with the reinforcing agent in a manner somewhat akin to the functioning of an emulsifier where one portion of the molecule is soluble in oil and the other portion is soluble in water. In the present case, the carrier is also soluble in water and fully compatible with the rubber portion of the latex and therefore being intimately associated with the reinforcing agent and being soluble in or compatible with the rubber particles of the latex, carries the reinforcing agent into intimate contact with the rubber particles, thus producing a true reinforcement of the rubber particles.

The present method of reinforcing rubber latex using a compatibilizing carrier of the nature described permits for the first time the true reinforcement of rubber in latex form without the necessity of breaking down the molecular weight of the rubber on a mill in order to permit the milling of the reinforcing agent into the rubber.

The present invention thus preserves the molecular weight of the rubber being treated since the reinforcement thereof is being done in the latex form and makes possible for the first time the vulcanization of the reinforced rubber at a molecular weight level of the rubber higher than has heretofore been possible when working in the dry state. Thus, dry rubber broken down on the mill from, for example, a molecular weight of from about 400,000 to about 250,000 (as determined by inherent viscosity measurements) is then cured. The 250,000 molecular weight rubber will have properties inferior to a 400,000 molecular weight rubber cured in the same manner. In the present invention the rubber recovered from the reinforced rubber latex would have, for example, an undisturbed molecular weight of 400,000, which then may be cured to produce a rubber having properties superior in regard to tensile, elongation, etc., to the properties of the same rubber if the rubber were broken down on a mill during mixing with carbon black and then cured.

As a result of the present invention, improved dipped goods may be manufactured using the reinforced rubber latex. For example, gloves having improved properties may be made by dipping a form in the reinforced rubber latex and, equally important, a fabric may be coated with the reinforced rubber latex which has been thickened to the desired viscosity and then dried to form a layer of rubber on the surface of the fabric without producing a grain effect as otherwise produced when dry rubber is calendered onto the fabric. Another important use for the reinforced latex is in, for example, building up a tire tread on a pneumatic tire carcass of fabric plies by rotating the fabric carcass in the reinforced rubber latex which has been thickened to the desired degree and then drying each layer of latex as it is deposited thereon until the desired thickness of tread is produced. The green tire is then placed in a mold and cured to produce a tire having improved properties.

Another important use of the reinforced latex of this invention is in the manufacture of cord-to-rubber adhesives wherein the reinforced rubber latex is compounded with conventional ingredients including, for example, resorcinol/formaldehyde resins, and other compounding ingredients to produce an adhesive having exceptional ability to securely bond tire cord to rubber in the construction, for example, of a pneumatic tire.

Any rubber in latex form may be reinforced in accordance with the process of this invention, including natural rubber and any of the known synthetic rubbers, particularly the diene rubbers and especially the conjugated diene hydrocarbon rubbers that are well-known in the synthetic rubber art and as described in greater detail in U.S. Patent 2,935,485, as well as the vinylpyridine/diene rubber copolymers made, for example, in the manner described in U.S. Patent 2,634,250.

Any reinforcing agent which may be colloidally dispersed in a composition compatible and/or dispersible in rubber or dispersible substantially to that degree obtained in a colloidal dispersion may be used, particularly the well-known reinforcing carbon blacks that are used in the rubber industry for the purpose of reinforcing or improving the tensile strength of rubber.

The following examples illustrate how the invention may be practiced. All parts are by weight unless otherwise identified.

EXAMPLE 1

Resin/carbon black/rubber latex mixture

Three parts of a water solution containing 75% solids of a resorcinol-formaldehyde resin known in the trade as Penacolite R2170 and hereinafter referred to as R/F resin and prepared generally in the manner disclosed below is dissolved in 30 parts of a 0.5% sodium hydroxide solution. To this carrier solution is added 30 parts of a medium processing carbon black with thorough stirring to form a preblend of a carbon black/resin mixture. This mixture is allowed to age for one hour at about 70° F. Additional water may be added to this aged mixture to adjust its viscosity. To this aged mixture is then added 250 parts of a 40% solids rubber latex, in this instance a latex of a 75 butadiene/25 styrene copolymer, and aged for 4 hours. The resulting carbon black reinforced rubber latex has a pH of about 10.

A conventional 8:00 x 14 tubeless pneumatic tire comprising an open-bellied, hollow annular body terminating in spaced apart bead portions and as described in greater detail in U.S. Patent 2,987,094 was made with plies of rubber compounded as shown below reinforced with polyester cord bonded to the rubber with the adhesive described above. The tire was tested by running it against a cleated wheel while inflated to 24 pounds pressure at 45 miles per hour under a static load of 1,500 pounds. Results of this test and other tests are as follows:

TABLE I

| Tire Data | Example 1 Adhesive | Control Adhesive (No black) |
| --- | --- | --- |
| 1″ Strip Adhesion (force required to separate plies of a 1-inch wide section of sidewall at 200° F.), lbs. | 40 | 25 |
| Cleated Wheel Separation, miles | 4,700 | 3,500 |
| High Speed Performance (Speed at which tire fails by tread separation), m.p.h. | 110 | 105 |

EXAMPLE 2

Cured film of carbon black reinforced latex

The carbon black reinforced rubber latex of Example 1 was compounded with 2 parts of sulfur, 5 parts of zinc oxide, 3 parts of stearic acid, 0.2 part of diphenyl guanidine, and 0.7 part of benzothiazyl disulfide.

A film of rubber from this compounded carbon black reinforced rubber latex was cast on a glass plate and dried for 1 hour and then cured under a pressure of 10 p.s.i. at 290° F. for various lengths of time as indicated in the table below and found to have developed the tensile strengths as indicated in contrast to the tensile strengths developed by the identical compounding of the same rubber latex used in Example 1 above without reinforcement thereof with carbon black in the manner described in Example 1.

TABLE II

| | Carbon Black Reinforced Latex Film | Control, p.s.i. |
| --- | --- | --- |
| 10 minutes | Tensile 360 p.s.i. | |
| 20 minutes | Tensile 1,250 p.s.i. | |
| 30 minutes | Tensile 2,320 p.s.i. | 350 |
| 40 minutes | Tensile 2,140 p.s.i. | 450 |

EXAMPLE 3

Cord-to-rubber adhesive

A resorcinol/formaldehyde resin known in the trade as Penacolite R2170 was made by reacting 1 mol of resorcinol with 0.7 mol of formaldehyde in the presence of 0.1 part of sodium hydroxide at 70° F. until the reaction was complete. 1 part of the resulting water-soluble resorcinol/formaldehyde resin was dissolved in 10 parts of water. To this solution of resin was added 5 parts of medium processing carbon black and allowed to age for 1 hour at 70° F. This aged mixture was added to 100 parts of an adhesive composition made in the following manner:

A resorcinol/formaldehyde blocked polyisocyanate was made by first preparing the resin blocking agent by reacting 110 parts of resorcinol with 25 parts of formalin (37% formaldehyde) and 20 parts of water at 100° C. for 15 minutes to which then is added an additional 30 parts of formalin and the mixture refluxed for 40 minutes to produce a thick, syrupy resin containing 60% solids having a viscosity of 750 cps. and a pH of 7. 20 parts of this thick syrupy resin is reacted with 6 parts of a mixture containing 60 parts of methylene triisocyanate and 40 parts of methylene diisocyanate at 72° F. for 48 hours to produce a water-soluble, resin-blocked polyisocyanate. The mixture of triisocyanate and diisocyanate may be represented by the formula

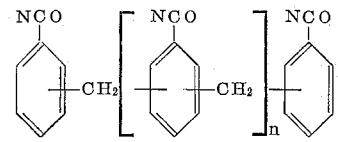

wherein $n$ has an average value of about 2.

This adhesive composition containing the carbon black reinforced latex is used as a dip which is aged from 4 to 24 hours before a rubber reinforcing cord is dipped therein. Specifically, a polyester cord 1100/2 was treated with the adhesive composition by passing the cord through the adhesive at such a rate as to deposit on the surface of the cord 8% of adhesive solids. The dipped cord was then dried at 425° F. for 2½ minutes and embedded in a rubber stock compounded as follows:

RUBBER STOCK

| Ingredients: | Parts |
| --- | --- |
| Natural rubber | 100 |
| Zinc oxide | 3.00 |
| Carbon black | 29.80 |
| Stearic acid | 2.00 |
| Pine tar | 7.00 |
| Mercaptobenzothiazole | 1.25 |
| Sulfur | 3.00 |
| Diphenylguanidine | 0.15 |
| Phenyl beta naphthylamine | 1.00 |

The following values were obtained:

TABLE III

| | Example 3 | Control |
| --- | --- | --- |
| Hot "U" Adhesion (¼″ sample pulled at 250° F. after a 4-minute cure at 400° F.), lbs. | 28 | 25 |
| Dynamic Strip, min./in. | 16 | 12 |
| Heat Durability (ASTM D-885-59T Sec. 42), kc. | 270 | 140 |

EXAMPLE 4

A carbon black/resin solution is prepared as above in Example 1. This solution is then added to 50 cc. of SBR rubber latex and allowed to age 24 hours. To this aged mixture is then added an R/F blocked polyisocyanate prepared as described in Example 3 above using the polyisocyanate prepared in the manner indicated in Example 3. The polyester cord was dipped in this adhesive and embedded in the rubber stock of Example 3 in the manner described above and the following test values were obtained:

|  | Example 4 | Control |
| --- | --- | --- |
| Hot "U" Adhesion, lbs | 31 | 25 |
| Dynamic Strip, min | 18 | 12 |
| Heat Durability, kc | 310 | 140 |

EXAMPLE 5

The same adhesive composition prepared in the manner described in Example 2 was used here except that the latex/resin/carbon black mixture was heated to 160° F. for 30 minutes before adding to the resin-blocked polyisocyanate component. The following data on polyester cord embedded in rubber in the manner described above was obtained:

|  | Example 5 | Control |
| --- | --- | --- |
| Hot "U" Adhesion, lbs | 34 | 25 |
| Dynamic Strip, min | 20 | 12 |
| Heat Durability, kc | 350 | 140 |

The adhesive prepared in Example 1 was duplicated with the exception that various grades of carbon black in various amounts were used and tested in the adhesive. The following values were obtained:

TABLE IV.—EFFECT OF TYPE OF CARBON BLACK
[30 parts per 100 RHC. Resin/Carbon Black Ratio 1/12]

|  | Hot "U" Adhesion | Dynamic Strip | Heat Durability |
| --- | --- | --- | --- |
| Control | 100 | 100 | 100 |
| MPC Black (medium processing channel black) | 124 | 144 | 202 |
| GPF Black (general purpose black) | 109 | 132 | 113 |
| MT Black (medium thermal black) | 114 | 157 | 270 |
| HAF Black [1] (high abrasion furnace black) | 118 | 130 | 215 |

[1] For description of the attrited type carbon blacks see U.S. Patent 2,890,839.

The values reported in Tables IV, V and VI are given as a percentage of the normal values for the control. In each instance, the control was identical with the examples, except that carbon black was not present.

TABLE V.—EFFECT OF CARBON BLACK LOADING
[Resin/Carbon Black Ratio ½]

| Type of Black | Parts Black/ 100 RHC | Hot "U" Adhesion | Dynamic Strip | Heat Durability |
| --- | --- | --- | --- | --- |
| Control | 0 | 100 | 100 | 100 |
| MPC | 7.5 | 109 | 174 | 192 |
| MPC | 15 | 126 | 155 | 235 |
| MPC | 30 | 123 | 140 | 202 |
| MPC | 60 | 105 | 150 | 183 |

TABLE VI.—EFFECT RESIN/CARBON BLACK RATIO

|  | Resin/ Black | Hot "U" Adhesion | Dynamic Strip | Heat Durability |
| --- | --- | --- | --- | --- |
| MPC Black | 0/4 | 100 | 100 | 100 |
| Do | 1/4 | 124 | 135 | 250 |
| Do | 3/4 | 119 | 123 | 241 |
| Do | 5/4 | 63 | 111 | 220 |
| Do | 1/0 | 85 | 90 | 100 |

Table VI shows that carbon black by itself is not effective and, also, that the resin is not a major factor but can actually be detrimental.

The reinforced rubber latex of this invention, when compounded with conventional accelerators, activators and curing agents, may be cured at lower temperatures and for less time to produce acceptable properties of tensile, elongation, hardness, etc., than when the latex is compounded with a reinforcing agent in a manner other than the manner disclosed in this invention. For example, the latex of Example 1, when dried into a rubber film and cured at 300° F. for 10 minutes produces a tensile strength of 2800 p.s.i. at 400% ultimate elongation having a Shore D hardness of 60. Without the use of the present invention tensile strengths of only 600 p.s.i. are developed only after heating from 350–400° F. for 20 minutes.

Any resinous composition which is capable of being further activated by means of a crosslinking agent to form an insoluble thermoset mass, but which otherwise is soluble in normal solvents and forms a flexible film, may be used as the principal adhesive component on the cord. The preferred type of resinous composition is that type made by reacting an aldehyde with a resin-forming component, such as urea, or a phenol, preferably a polyhydric phenol such as resorcinol, and of particular desirability are the phenolic resins that are substantially soluble in water and formed in the presence of either a molar deficiency or sufficiency of aldehyde.

In the present invention, the phenolic/aldehyde deficient resin used in treating the cord is made by reacting the polyhydric phenol, such as resorcinol with a deficient amount of an aldehyde such as formaldehyde. Suitable aldehydes that may be used, in addition to the preferred aldehyde formaldehyde, are acrolein, glyoxal, furfural, crotonaldehyde, aldol, hexamethoxymethylmelamine, and benzaldehyde.

Suitable phenols that may be reacted with a molar deficient amount of one of the aforementioned aldehydes include, in addition to the polyhydric phenol, resorcinol, other difunctional compounds such as cresol, catechol, phloroglucinol, saligenin, dibeta naphthol, xylenol, 4,6-dimethyl-resorcinol, 2,5-dimethyl-resorcinol, hydroquinone, furfural alcohol, orcinol, pyrogallol beta-naphthol, aminophenol, guaiacol, as well as urea and melamine.

In making the aldehyde type polyfunctional resin, it is desirable to have an excess of the polyfunctional component, such as resorcinol, present during the reaction with the aldehyde. Under these conditions, a resin is produced which is soluble in water and found reactive in the presence of additional aldehyde and thus chemically reactive as an adhesive component in bonding a cord to rubber, and particularly when used in combination with an R/F/L adhesive, i.e., a resorcinol/formaldehyde/rubber latex mixture.

A particularly desirable aldehyde type polyfunctional type resin that is useful in the present invention in the treatment of any cord normally used to reinforce rubber is one made by reacting the resorcinol with formaldehyde in ratios of resorcinol to formaldehyde ranging from 1.0/0.25 to 1.0/0.99. In making this particular resorcinol/formaldehyde resin, it is required that a molar ratio of formaldehyde to resorcinol of less than about 1.0 be used and preferably a ratio of between about 0.5 and about 0.75. The reaction of the resorcinol and the formaldehyde may be carried out either in a neutral medium or a medium made basic with, for example, sodium hydroxide, or made acidic with, for example, oxidic acid. It is preferred to use a resorcinol/formaldehyde resin made from reacting about 1.0 part of resorcinol with about 0.7 part of formaldehyde.

Other resins that may be used include the water-soluble resin-blocked polyisocyanate made by reacting a polyisocyanate with a water-soluble phenolic/aldehyde resin. These resin-blocked polyisocyanates may be used alone or in combination with the phenolic/aldehyde deficient resins described above. When used alone, it is preferred that the resin blocking component be made with a deficiency of aldehyde. Any polyisocyanate may be reacted with a water-soluble aldehyde/phenolic type of resin to form a temporary blocking of the polyisocyanate against its reactivity with water at temperatures at least below 212° F. and also insure the production of a resin that is chemically reactive as an adhesive component in bonding a cord to rubber and particularly in combination with an R/F/L adhesive containing a rubber latex, when the blocked polyisocyanate is heated to regenerate the polyisocyanate and the phenolic resin. Any of the well-known polyisocyanates may be used in making the resin-blocked polyisocyanate including triphenyl methanetri-isocyanate, 2,4-tolylene-diisocyanate, hexamethylene-diisocyanate, and particularly the mixed polyisocyanates corresponding to the formula

in which R and R' are arylene radicals, Y is hydrogen, alkyl, and aryl radicals, $n$ is a whole number, and the (CY$_2$—R'—NCO) groups in excess of one are attached to an R' radical. It is preferred to use a polyisocyanate wherein $n$ has an average value of about 2 and such a mixture may be made by reacting aniline with formaldehyde which product is then phosgenated in chlorobenzene in the manner described in U.S. Patent 2,683,730. A particularly desirable aldehyde type of blocking agent useful in temporarily blocking the polyisocyanate is one made by reacting resorcinol with formaldehyde in ratios of resorcinol to formaldehyde of 1.0/0.25 to 1.0/1.0. It is preferred to use a deficient amount of formaldehyde in making the phenol/aldehyde blocking resin and preferably between 0.5 and 0.75 mol of aldehyde per mol of phenol.

The rubber latex reinforced in accordance with the method of this invention may be coagulated under controlled pH conditions to produce a product having different physical properties depending upon the pH condition used. For example, when the reinforced rubber latex is coagulated with, for example, a salt such as sodium chloride at a pH of about 10, the rubber is recovered as a powdered rubber which may then be extended with conventional petroleum hydrocarbon oils. The powdered form of the rubber greatly improves the processing thereof. When the reinforced rubber latex is coagulated at a pH of less than 7, the rubber is tacky whereas the product is dry and non-tacky when coagulated at a pH of from about 7 to about 10. The reinforced rubber is useful as a carbon black masterbatch for the manufacture of tread stock and ply stock for use in the construction of a pneumatic tire.

While certain representative embodiments and details have been shown for the purpose of illustrating the invention, it will be apparent to those skilled in this art that various changes and modifications may be made therein without departing from the spirit or scope of the invention.

What is claimed is:

1. The method of reinforcing rubber in latex form which comprises blending carbon black with a water solution of a water-soluble phenol/aldehyde-deficient resin to form a blend of the carbon black and the resin which is then mixed with the rubber latex, aging the mixture until the rubber portion of the latex is reinforced with the carbon black.

2. The method of claim 1 wherein the aldehyde is formaldehyde.

3. The method of claim 1 wherein the phenol is resorcinol.

4. The method of claim 3 wherein the aldehyde is formaldehyde.

References Cited by the Examiner
UNITED STATES PATENTS

| | | | |
|---|---|---|---|
| 2,046,757 | 7/1936 | Tucker et al. | 106—307 |
| 2,349,756 | 5/1944 | Pratt | 260—70 |
| 2,481,879 | 9/1949 | Ross | 260—29.3 |
| 2,561,215 | 7/1951 | Mighton | 260—29.3 |
| 2,794,749 | 6/1957 | Schulze | 106—307 |
| 3,226,276 | 12/1965 | Rye et al. | 260—29.3 |

OTHER REFERENCES

Sutheim: Introduction to Emulsions, Chemical Pub. Co., Brooklyn, N.Y., 1946, TP 156 E658, pp. 160–164.

MURRAY TILLMAN, *Primary Examiner.*

SAMUEL H. BLECH, *Examiner.*

J. C. BLEUTGE, *Assistant Examiner.*